F. T. CALLON.
AUTOMATIC CUT-OFF VALVE FOR GASOLENE ENGINES.
APPLICATION FILED MAY 7, 1917.
1,262,013.
Patented Apr. 9, 1918.
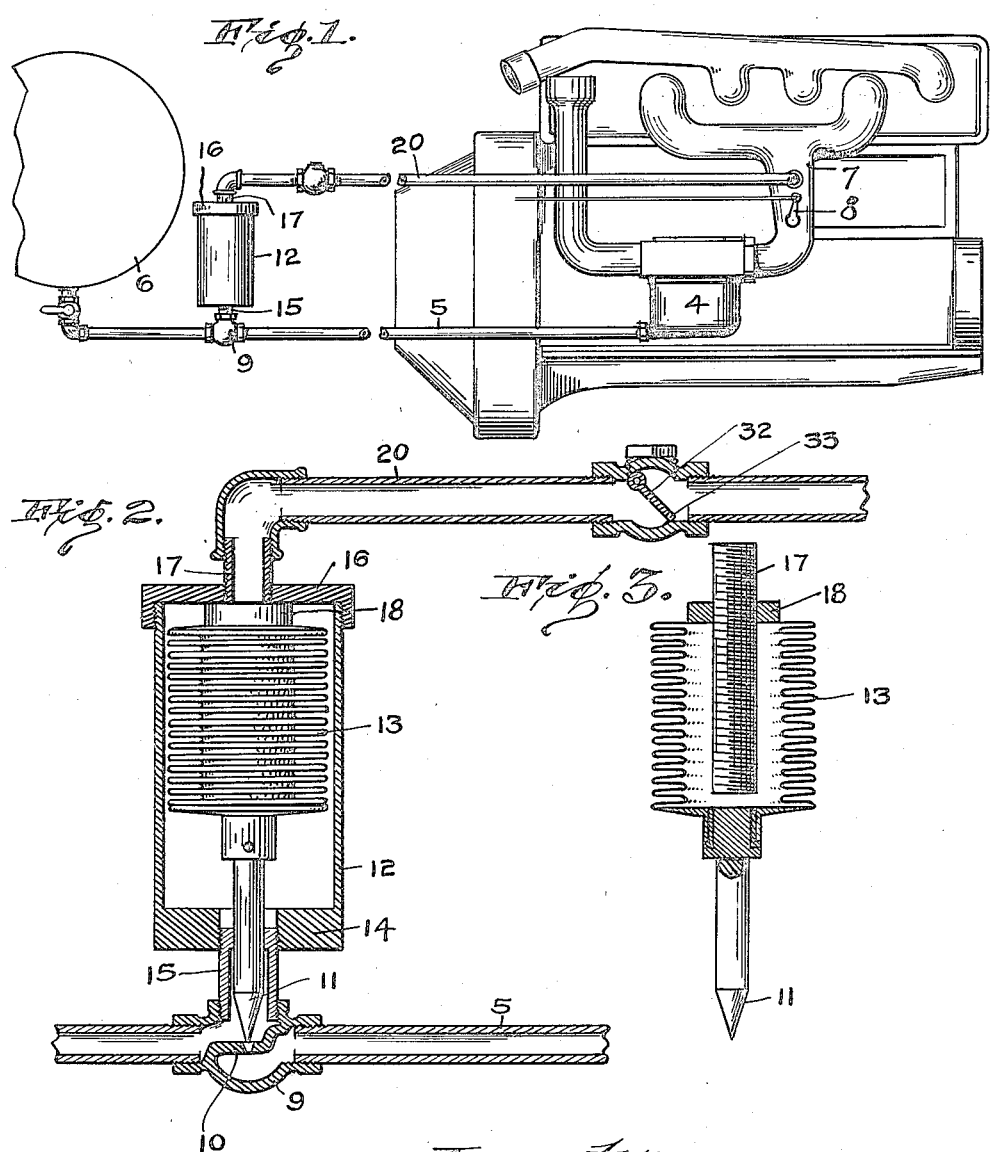
Inventor,
Frank T. Callon,
By Minturn & Woerner,
Attorneys

UNITED STATES PATENT OFFICE.

FRANK T. CALLON, OF INDIANAPOLIS, INDIANA.

AUTOMATIC CUT-OFF VALVE FOR GASOLENE-ENGINES.

1,262,013. Specification of Letters Patent. Patented Apr. 9, 1918.

Application filed May 7, 1917. Serial No. 166,999.

*To all whom it may concern:*

Be it known that I, FRANK T. CALLON, a citizen of the United States, residing at Indianapolis, in the county of Marion and State of Indiana, have invented certain new and useful Improvements in Automatic Cut-Off Valves for Gasolene-Engines, of which the following is a specification.

The object of this invention is to utilize the suction of an internal combustion engine to open a valve in the supply pipe against the closing action of a spring, for the supply of gasolene therethrough while the engine is running, but which will automatically close to cut off the supply the moment the engine stops running.

A further object is to remove the danger of fire by avoiding a reservoir of gasolene close to the engine, such as obtains with float-controlled carbureters requiring a reservoir in which to operate the float, now in general use.

I accomplish the above and other objects by the mechanism illustrated in the accompanying drawings, in which—

Figure 1 is a view in side elevation of a gasolene engine of a type in common use on automobiles, equipped with my invention. Fig. 2 is a view in vertical section, on a larger scale, of my improved cut-off valve, and Fig. 3 is a section of the bellows device used in my improved valve, which part is shown in elevation in Fig. 2.

Like characters of reference indicate like parts in the several views of the drawing.

The carbureter 4 is supplied with gasolene through a pipe 5, from a tank 6, placed at any safe and desirable place. The carbureter discharges to the engines through a manifold 7 which is controlled by a butter-fly valve having an outside crank 8.

In the exercise of my invention I cut the supply pipe 5 at any desired place and connect in a member 9 having a partition 10 which closes off the connection between the severed members of the pipe. A discharge opening of the desired size is made through the partition 10 and forms a seat for a needle valve 11 which shuts off the discharge of gasolene through the opening when it is seated. The stem of the needle valve enters a cylinder 12, and is attached to the bottom of a sheet metal bellows 13, contained within said cylinder. The cylinder head 14 is connected with the valve member 9 by a pipe 15 having an inturned end which acts as a guide to direct the valve into its seat. The upper end of the cylinder is closed by a cap 16, having a flange with an inside thread into which the threaded end of the cylinder screws. Entering the cylinder through the cap 16, is an externally threaded pipe 17 which screws through a suitably threaded hole in the cap, and also through a boss 18 on the upper end of the bellows. The pipe 17 terminates at such proximity to the lower end of the bellows as to arrest the upward movement of the latter and determine the maximum opening of the valve. The extent of valve-opening is regulated by screwing the pipe in or out through cap 16 and boss 18.

The pipe 17 is connected by means of a pipe 20, with the intake manifold 7, between the butterfly valve in the latter and the branching of the manifold, whereby the bellows is so connected with the engine that the air in the bellows will be exhausted by the latter, causing the bellows to collapse and draw the valve 11 out of its seat. The resiliency of the metal from which the bellows is formed is utilized to cause it to expand when the suction is removed within it, thereby reseating the valve and closing the flow of gasolene from the tank.

The breaking of the vacuum in the bellows by a reverse action of the engine is prevented by a pallet-valve 32 in the pipe 20. A small vent 33 in the valve allows the air to gradually refill the bellows and the valve 11 to be reseated when the engine is stopped.

My invention may be used with or without the usual carbureter, but where the carbureter is used its reservoir and float may be eliminated thereby removing the danger of fire.

Having thus fully described my invention what I claim as new and wish to secure by Letters Patent of the United States is—

1. The combination with an internal combustion engine and a tank containing a liquid hydrocarbon, of a conduit from the tank to the engine, a valve in said conduit, a spring means to close the valve, and means to open the valve comprising a bellows to which the valve is attached and a conduit connecting the interior of the bellows with the interior of the engine.

2. The combination with an internal combustion engine and a tank containing a liquid hydrocarbon, of a conduit from the tank to the engine, a valve in said conduit, automatic means to close the valve, automatic means to open the valve comprising a bellows to which the valve is attached, a conduit connecting the interior of the bellows with the interior of the engine and a pallet-valve in said last conduit said pallet-valve having a vent opening.

3. The combination with an internal combustion engine and a tank containing a liquid hydrocarbon, of a supply pipe from the tank to the engine, a valve in said supply pipe, a bellows to which the valve is attached said bellows having an elastic action which normally expands it, a closed cylinder within which the bellows is mounted, and an air conduit connecting the interior of the bellows with the interior of the engine.

In witness whereof I have hereunto set my hand and seal at Indianapolis, Indiana, this 16th day of April, A. D. one thousand nine hundred and seventeen.

FRANK T. CALLON. [L. S.]